United States Patent [19]
Ross et al.

[11] Patent Number: 5,494,503
[45] Date of Patent: Feb. 27, 1996

[54] SOIL RELEASE COATING FOR HEAT TRANSFER SURFACES

[75] Inventors: Cynthia L. Ross, Roseville; Michael E. Besse, Golden Valley; Timothy A. Gutzmann, Eagan, all of Minn.

[73] Assignee: Ecolab Inc., St. Paul, Minn.

[21] Appl. No.: 390,861

[22] Filed: Feb. 16, 1995

[51] Int. Cl.$^6$ ................................ C09D 1/00; C09D 5/00
[52] U.S. Cl. ................................................................ 106/2
[58] Field of Search ........................................... 106/2

[56] References Cited

U.S. PATENT DOCUMENTS

| | | | |
|---|---|---|---|
| 3,196,027 | 7/1965 | White et al. | 106/287 |
| 3,303,052 | 2/1967 | Hatch et al. | 117/169 |
| 3,460,523 | 8/1969 | Stiles et al. | 126/19 |
| 3,877,972 | 4/1975 | Arnold | 427/384 |
| 4,877,691 | 10/1989 | Cockrell, Jr. | 428/688 |
| 5,234,719 | 8/1993 | Richter et al. | 427/384 |
| 5,370,729 | 12/1994 | Man et al. | 106/2 |

FOREIGN PATENT DOCUMENTS

| | | |
|---|---|---|
| 1047903 | 2/1979 | Canada . |
| 0570631A | 11/1993 | European Pat. Off. . |
| 50-079530 | 11/1973 | Japan ........................................ 106/2 |
| 3-38254 | 2/1991 | Japan . |
| 1671678A1 | 8/1991 | U.S.S.R. . |

*Primary Examiner*—David Brunsman
*Attorney, Agent, or Firm*—Merchant, Gould, Smith, Edell, Welter & Schmidt

[57] ABSTRACT

The invention relates to a coating composition film or barrier layer containing an inorganic salt composition having a phosphate and a carbonate source and a surfactant composition. The aqueous coating can be applied to surfaces in food preparation units. The compositions of the invention can be used in methods for coating hard surfaces of food preparation units by applying the aqueous material through a spray or other aerosol apparatus to form a uniform coating. Upon drying, the water from the coating can evaporate leaving an organic/inorganic film which can support baked-on food soil and promote easy removal.

23 Claims, No Drawings

SOIL RELEASE COATING FOR HEAT TRANSFER SURFACES

FIELD OF THE INVENTION

The cleaning of the interior surface of food preparation units including large, industrial electrically heated ovens, gas fired ovens, microwave ovens, smoke houses, fryers, etc., and associated surfaces, is a difficult and distasteful task. The food soils involved are often stubborn and disagreeable and cleaners used to remove the soils are harsh. The invention relates to compositions that can be used to introduce a barrier coating onto heat transfer surfaces that come into contact with food soils. The coatings act to promote the removal of such difficult, disagreeable soils from the food preparation unit. The coatings of the invention form a barrier coating, between the hardened baked-on soil and the surfaces of the food preparation unit, that promotes soil removal. Such soils and residues formed on the coating are then more easily removed with use of a hot water high pressure hose resulting in less scraping and scouring with the use of commercially available cleaning preparations. Thus, the food preparation surfaces can be cleaned using substantially less disagreeable and less harsh cleaning preparations.

BACKGROUND OF THE INVENTION

The formation of hard baked-on food soils on surfaces of food preparation units has been a problem faced by industrial and institutional cleaning personnel for many years. During cooking, food soils commonly come into contact with heated metallic or porcelain surfaces in food preparation units. The food soils, containing various proportions of inorganic materials and of organic proteinaceous, fatty or carbohydrate soils, can become baked-on and can become hard or can be carbonized. Such soils are very difficult to remove, require substantial energy input during cleaning and often require very high concentrations of harsh disagreeable cleaning materials. A substantial need has existed in this art for solutions, other than using stronger cleaners, to improve the effective removal of such soils.

One attempt to reduce the difficulty in removing these soils relates to the use of self-cleaning ovens that ash the soil at high temperatures. Self-cleaning ovens commonly contain a catalytic coating on the interior heated surface of the food preparation unit. Periodically, the food preparation unit is heated to a temperature of about 500°–600° F. At this temperature the catalytic surface is designed to promote the combustion and removal of the hard baked-on soils resulting in ashing the soil which then can be removed without difficulty. One example of such catalytic coatings is found in Stiles et al., U.S. Pat. No. 3,460,523, which is directed to a finely divided thermally stable oxidation catalyst.

Another attempt to reduce the difficulty in removing such baked-on soils is found in attempts to formulate barrier coatings that can be used on heated food preparation units. Examples of such materials include White et al., U.S. Pat. No. 3,196,027, who teach a hydrocarbon solvent containing a dimethyl polysiloxane. Hatch et al, U.S. Pat. No. 3,303,052, teach a hydrophilic synthetic tetrasilicic fluorine mica that is applied to a food preparation surface in the form of an aqueous aerosol used with a fluorocarbon propellant. Arnold, U.S. Pat. No. 3,877,972, teaches a metal phosphate polymer composition which is exemplified by an aluminum ethyl oleyl orthophosphate dissolved in hexane. Dimond, Canadian Patent No. 1,047,903, teaches an oven cleaner composition. The aqueous cleaner, which is not used as a barrier coating, uses as active cleaning ingredients, a substantial proportion of an aqueous base comprising a mixture of sodium hydroxide and monoethanol amine, a clay-like bentonite thickener with other ingredients to form an aerosol oven cleaner. Cockrell, Jr., U.S. Pat. No. 4,877,691 (PCT International Application No. PCT/US91/05092), teaches a pretreatment composition comprising an aqueous dispersion of an inorganic thickening agent such as a Veegum® clay, an inorganic water soluble salt such as sodium or potassium bicarbonate with a small amount of a wetting agent.

Makiko et al., Japanese Patent Publication No. 03-038,254, teach a film that provides a hard slippery surface to permit removal of oily stains. The film comprises a layered structure compound and a solid inorganic oxide compound with a polysiloxane binder.

Russian Patent SU 167 1678 describes a release coating from an aqueous composition containing approximately a 20:1 ratio of soda ash to sodium tripolyphosphate, liquid silicate, alkylsulphate and laundry soap.

U.S. Pat. No. 5,370,729 describes a barrier coating using a combination of a neutral organic fatty component, an inorganic material that has some finite water solubility and an organic water soluble thickener composition.

The materials used to form barrier coatings in ovens that promote the release of the baked-on fatty soils have had some success. However, the highly inorganic nature of certain materials renders the partially insoluble coatings difficult to disperse. Further, many barrier coatings, tend to become hardened and difficult to remove with mild aqueous detergents. For example, lecithin or lecithin mixtures currently in use, at high oven temperatures, form a varnish-like surface deposit which becomes part of the "soil" that is difficult to remove. Lastly, many materials in the prior art tend not to form a sufficient barrier. In many instances, the coatings do not produce a sufficient barrier and do not sufficiently promote soil removal to be acceptable in many institutional or household environments.

A substantial need remains in the art to form an aqueous composition that can be applied to act as a barrier between the formation of hardened, carbonized baked-on fatty soils and heat transfer surfaces. The barrier coatings and the subsequent baked-on soils should be easily removed without substantial difficulty with less aggressive and/or reduced amounts of cleaning compositions.

BRIEF DISCUSSION OF THE INVENTION

We have found that a substantial improvement in the properties of barrier coatings for heated food preparation surfaces can be made by using a combination of an inorganic composition having a phosphate and carbonate source and a surfactant composition.

These materials, when applied to a food preparation unit can form a coating composition that withstands a wide variety of temperatures during a heating cycle in commonly available institutional and household ovens while maintaining substantial barrier properties against the build up of food soils. After the composition is applied to a cool surface in the unit, the unit can be heated to dry the film into a robust, somewhat hardened but workable barrier coating.

These materials are also applicable to hoods and ducts in institutional ovens or processing surfaces (horizontal or vertical) which have indirect contact with food, at ambient or elevated temperatures, in other words, anywhere organic soil adheres to surfaces in food plants, but is not in contact with water.

The compositions of the invention comprise (a) about 0.1 to 99 wt % of an inorganic salt composition having a phosphate source and a carbonate source in a weight ratio of 10:1 to 1:8; and (b) about 0.1 to 30 wt % of a surfactant composition. Such a composition can be applied to oven surfaces using commonly available spray-on devices to form a stable, uniform coating. The coatings formed by spraying these compositions can resist becoming brittle, chipping or flaking at the high temperatures found in food preparation units. These coating compositions are substantially soluble or dispersible in aqueous liquids or cleaners and can easily be removed using water or less aggressive and/or reduced amounts of aqueous cleaning compositions. The inorganic salts and the surfactant, e.g. a fatty acid salt (soap), cooperate with aqueous cleaners to promote removal. The coating compositions of the invention avoid using insoluble inorganic compositions, in particular insoluble inorganic thickeners such as clays which can cause difficulty in removal of the barrier coating after heating cycles. Accordingly, the compositions of the invention are substantially free of any substantial proportion of an insoluble inorganic thickener or clay. The compositions are also free of organic thickeners.

DETAILED DESCRIPTION OF THE INVENTION

The barrier coating compositions of the invention are made in aqueous solution and contain soluble inorganic salts. Such inorganic salts comprise a combination of alkali metal phosphate and carbonate salts. Preferred salts are wholly inorganic water soluble, food safe salts including sodium phosphate, potassium phosphate, sodium tripolyphosphate, trisodium phosphate, tripotassium phosphate, sodium carbonate, potassium carbonate, sodium bicarbonate, potassium bicarbonate, sodium sesquicarbonate, potassium sesquicarbonate and the like.

The compositions of the invention combine the aqueous soluble salt composition with a surfactant composition. The surfactant composition is an anionic, amphoteric or nonionic surfactant and mixtures thereof. Preferred mixtures are anionic and amphoteric surfactants. These surfactants are easily blended in solid form with the inorganic salt composition or in an aqueous dispersion to form a substantially uniform material. The surfactants aid in wetting the surface of the food preparation unit and participate in forming the barrier coating which can support substantial quantities of proteinaceous or fatty soils.

SURFACTANT

The aqueous cleaning compositions of the invention contains an organic surfactant composition. Anionic, nonionic or amphoteric surfactants can be used. Anionic materials that can be used in the compositions of the invention are surfactants containing a large lipophilic moiety and a strong anionic group. Such anionic surfactants contain typically anionic groups selected from the group consisting of sulfonic, sulfuric or phosphoric, phosphonic or carboxylic acid groups which when neutralized will yield sulfonate, sulfate, phosphonate, or carboxylate with a cation thereof preferably being selected from the group consisting of an alkali metal, ammonium, alkanol amine such as sodium, ammonium or triethanolamine. Examples of operative anionic sulfonate or sulfate surfactants include alkylbenzene sulfonates, sodium xylene sulfonates, sodium dodecylbenzene sulfonates, sodium linear tridecylbenzene sulfonates, potassium octyldecylbenzene sulfonates, sodium lauryl sulfate, potassium lauryl sulfate, ammonium lauryl sulfate, sodium palmityl sulfate, sodium cocoalkyl sulfate, sodium olefin sulfonate.

Other operative anionic surfactants for the present invention are the fatty carboxylic acid soaps commonly made by saponifying natural fats with inorganic base such as sodium or potassium hydroxide or can be made by neutralizing or partially neutralizing free fatty acids with alkali metal bases such as sodium hydroxide or potassium hydroxide or with an organic base such as an alkanolamine, e.g., triethanolamine. The saturated and unsaturated fatty acid materials or blends thereof used in the invention can comprise a $C_{6-24}$ fatty acid or mixtures thereof. Examples of such acids include caproic ($C_6$), caprylic ($C_8$), capric ($C_{10}$), lauric ($C_{12}$), myristic ($C_{14}$), palmitic ($C_{16}$), stearic ($C_{18}$), eicosanoic ($C_{20}$), docosanoic ($C_{22}$), tetracosanoic ($C_{24}$), and mixtures thereof. Preferred acids include coconut fatty acid and oleic acid or a mixture thereof.

Amphoteric surfactants are also useful in the invention. Amphoteric surfactants contain both an acidic and a basic hydrophilic moiety in the structure. These ionic functions may be any of the ionic or cationic groups that have just been described previously in the sections relating to anionic or cationic surfactants. Briefly, anionic groups include carboxylate, sulfate, sulfonate, phosphonate, etc. while the cationic groups typically comprise compounds having amine nitrogens. Many amphoteric surfactants also contain ether oxides or hydroxyl groups that strengthen their hydrophilic tendency. Preferred amphoteric surfactants of this invention comprise surfactants that have a cationic amino group combined with an anionic carboxylate or sulfonate group. Examples of useful amphoteric surfactants include the sulfobetaines, N-coco- 3,3-aminopropionic acid and its sodium salt, n-tallow- 3-amino-dipropionate disodium salt, sodium laurimino dipropionate, 1,1-bis(carboxymethyl)-2-undecyl-2-imidazolinium hydroxide disodium salt, cocoaminobutyric acid, cocoaminopropionic acid, cocoamidocarboxy glycinate, and cocobetaine. Preferred amphoteric surfactants for use in the compositions of the invention include cocoamidopropylbetaine, cocoaminoethylbetaine and sodium lauriminodipropionate.

Also useful as active surfactants in the present invention are nonionic surfactants. Nonionic surfactants carry no discrete charge when dissolved in aqueous media. Hydrophilicity of the nonionic is provided by hydrogen bonding with water molecules. Such nonionic surfactants typically comprise molecules containing large segments of a polyoxyethylene group in conjunction with a hydrophobic moiety or a compound comprising a polyoxypropylene and polyoxyethylene segment. Polyoxyethylene surfactants are commonly manufactured through base catalyzed ethoxylation of aliphatic alcohols, alkyl phenols and fatty acids. Polyoxyethylene block copolymers typically comprise molecules having large segments of ethylene oxide coupled with large segments of propylene oxide. Examples of nonionics useful in the present invention are ethylene oxide/propylene oxide block copolymers, glycerol esters, polyoxy-ethylene glycerol esters, polyglycerol esters, sorbitan esters, polyoxyethylene sorbitan esters, sucrose esters, and polyethylene ethers.

The coating compositions of the invention can be manufactured by blending the ingredients in commonly available manufacturing equipment to form a homogeneous powder or a stable single phase aqueous solution or dispersion. The usual method involves adding the surfactant or surfactants of choice onto the inorganic salt composition. Accordingly, it is preferred that the surfactant be first dispersed into service. In the instance that a soap is used as a surfactant, the soap is prepared during, or prior to, the manufacture of the material by neutralizing or partially neutralizing carboxylic acids or blends with a proportion of an alkali metal base such as sodium hydroxide or potassium hydroxide. Following the preparation of the soap, it can then be absorbed onto the inorganic salt combination to form a powder or tablet, or be diluted in an aqueous solution, to which the inorganic salt combination is then added, forming a slurry, concentrate or dilute solution. Exemplary formulations of the materials are found below in Table 1.

TABLE 1

| | Formulations (wt %) | | |
|---|---|---|---|
| | Useful | Preferred | Most Preferred |
| Inorganic Salt Composition | 0.1–99 | 0.15–90 | 0.50–80 |
| Surfactant Composition | 0.01–30 | 0.015–25 | 0.05–20 |
| Water | 0–99 | 0–99 | 0–99 |

The above formulations include the barrier coating composition in powder form as well as aqueous dispersions or solutions. After manufacture, the compositions can be applied to a hard surface using a pump sprayer or aerosol spray device. In an aerosol spray device, the composition of the invention is combined with a propellant such as butane, propane, freon, nitrous oxide or other commonly available propellants or mixtures thereof. The amount of propellant used commonly ranges from about 5 to about 50 wt % of the contents of the aerosol container. In the instance a pump sprayer is used, the spray nozzle and the material are matched for viscosity purposes and material delivery.

After application, the aqueous materials are dried at ambient conditions or at elevated temperatures to ensure the coatings dry to a white film-like organic/inorganic deposit. One preferred method for ensuring that the coatings of the invention are dried fully involves cycling the food preparation unit through a heating cycle wherein the composition reaches a temperature greater than about 100° C. up to about 300° C. for 10 to 40 minutes. The coatings of the invention when formed are inorganic/organic in nature; while flexible and robust, are not hard or brittle.

Once the films are fully formed, the oven can be operated in normal fashion. Foods can be processed and cooked in normal cycles at recommended temperatures. No changes in the operation of the oven are required by the compositions of the invention.

The following examples and data provide a basis for understanding the operation of the invention and include a best mode.

EXAMPLES

General Procedure for Preparation of Coating Compositions

A) Soap as Surfactant

Oleic fatty acid is neutralized or partially neutralized with a 45 wt % active aqueous potassium hydroxide solution, until a smooth, homogenous paste is produced. This can be diluted with water to form a flowable concentrated solution, which can then be absorbed onto a combination of sodium tripolyphosphate and sodium carbonate which has a weight ratio between about 10:1 to 1:8, resulting in a powder. Otherwise, the solid soap may be milled and then blended with the inorganic salt combination to form a powder.

Alternatively, an aqueous composition may be made by charging a quantity of water with a carboxylic acid or blend of carboxylic acids, followed by a quantity of 45 wt % active aqueous potassium hydroxide solution sufficient to neutralize or partially neutralize the carboxylic acid, producing a soap in situ. After the soap is formed, the inorganic salts can then be added to the solution, mixing until clear and uniform.

B) Other Surfactants

Surfactants other than soaps are blended with an alkali metal phosphate and carbonate mixture, whose weight ratio is between about 10:1 to 1:8, resulting in a powder. Alternatively, these may also be formed as an aqueous composition by first dispersing the surfactant in water, followed by the addition of the inorganic salts, mixing until clear and uniform.

C) Preparation of Use Solution

The above powder composition from A) and/or B) above may be dissolved in warm water to a concentration of about 1–20%, preferably about 5–10% by wt., or most preferably about 6–8%, and sprayed on the surfaces to be treated. These powders may alternatively be sprayed on dry, to a wetted surface.

The liquid compositions described above do not necessarily require further dilution, and may be used at full strength.

Basic test method:

1) Prototype formulas (i.e. compositions) are applied to clean stainless steel test panels by immersing half of the panel into the product solution.

2). Panels are placed into a 200° C. oven for 15 minutes to evaporate the water, leaving a dry film behind.

3) Panels are removed from the oven and a test soil (3 parts lard to 4 parts all-purpose batter mix, Golden-Dipt®) is applied to the entire hot surface of the panel to allow an even distribution of the soil.

4) Panels are returned to the 200° C. oven and placed in a horizontal position for approximately 2 hours to develop a difficult soil.

5) Panels are removed and allowed to cool to room temperature.

6) Panels are placed in 150 ml beakers containing 130 g. of 160° F. water which will totally immerse the soiled area of the panel. NOTE: No agitation is to take place. The panels remain in the water for 30 minutes and an assessment of soil removal is made.

7) The panels are removed and rinsed with a gentle warm tap water rinse. Soil removal is again visually assessed.

FORMULATIONS

The following compositions (formulations) were prepared:

| Example 1 | wt % | Example 2 | wt % |
|---|---|---|---|
| $Na_2CO_3$ | 10.30 | $Na_2CO_3$ | 5.30 |
| TSP | 6.00 | STPP | 6.00 |
| LAS, 97% | 0.24 | Triethanolamine | 0.08 |
| Water | qs | Oleic fatty acid | 0.17 |

| Example 3 | wt % | Example 4 | wt % |
|---|---|---|---|
| | 100.0% | Water | qs |
| | | | 100.0% |
| $Na_2CO_3$ | 5.30 | $Na_2CO_3$ | 5.30 |
| STPP | 6.00 | STPP | 6.00 |
| KOH, 45% | 0.05 | SLS, 30% | 0.83 |
| Coconut fatty acid | 0.20 | Water | qs |
| Water | qs | | 100.0% |
| | 100.0% | | |

| Example 5 | wt % | Example 6 | wt % |
|---|---|---|---|
| $Na_2CO_3$ | 10.30 | $Na_2CO_3$ | 5.30 |
| STPP | 6.00 | STPP | 3.00 |
| SLS, 30% | 1.00 | LAS, 97% | .25 |
| Water | qs | Water | qs |
| | 100.0% | | 100.0% |

| Example 7 | wt % | Example 8 | wt % |
|---|---|---|---|
| $Na_2CO_3$ | 5.30 | $K_2CO_3$ | 10.30 |
| STPP | 6.00 | STPP | 6.00 |
| LAS, 97% | 0.25 | KOH:45% | 0.05 |
| Water | qs | Coconut fatty acid | 0.20 |
| | 100.0% | Water | qs |
| | | | 100.0% |

| Example 9 | wt % | Example 10 | wt % |
|---|---|---|---|
| $Na_2CO_3$ | 2.82 | $K_2CO_3$ | 5.30 |
| STPP | 3.75 | STPP | 6.00 |
| Tween 20 | 0.73 | KOH:45% | 0.05 |
| KOH:45% | 0.17 | Coconut fatty acid | 0.20 |
| Oleic fatty acid | 0.56 | Water | qs |
| Water | qs | | 100.0% |
| | 100.0% | | |

| Example 11 | wt % | Example 12 | wt % |
|---|---|---|---|
| $Na_2CO_3$ | 10.30 | $Na_2CO_3$ | 2.74 |
| STPP | 6.00 | STPP | 3.65 |
| LAS, 97% | 0.24 | KOH, 45% | 0.17 |
| Water | qs | Oleic fatty acid | 0.56 |
| | 100.0% | Water | qs |
| | | | 100.0% |

| Example 13 | wt % | Example 14 | wt % |
|---|---|---|---|
| $Na_2CO_3$ | 5.48 | $Na_2CO_3$ | 3.30 |
| STPP | 1.10 | TSP | 2.00 |
| KOH, 45% | 0.17 | STPP | 10.00 |
| Oleic fatty acid | 0.56 | SLS, 30% | 1.50 |
| Water | qs | Water | qs |
| | 100.0% | | 100.0% |

| Example 15 | wt % | Example 16 | wt % |
|---|---|---|---|
| $Na_2CO_3$ | 5.84 | $Na_2CO_3$ | 5.30 |
| STPP | 0.73 | STPP | 6.00 |
| KOH, 45% | 0.17 | SLS, 30% | 0.83 |
| Oleic fatty acid | 0.56 | Water | qs |
| Water | qs | | 100.0% |
| | 100.0% | | |

| Example 17 | wt % | Example 18 | wt % |
|---|---|---|---|
| $Na_2CO_3$ | 2.82 | $Na_2CO_3$ | 2.82 |
| STPP | 3.75 | STPP | 3.75 |
| Hodag PGS-101 | 0.15 | Schercotaine CAB-G, 35% | 2.86 |
| Water | qs | | |
| | 100.0% | Water | qs |
| | | | 100.0% |

| Example 19 | wt % | Example 20 | wt % |
|---|---|---|---|
| $Na_2CO_3$ | 2.82 | $Na_2CO_3$ | 2.82 |
| STPP | 3.75 | STPP | 3.75 |
| Schercotaine CAB-G, 35% | 1.00 | KOH, 45% | 0.17 |
| KOH, 45% | 0.06 | Oleic fatty acid | 0.56 |
| Oleic fatty acid | 0.19 | Water | qs |
| Water | qs | | 100.0% |
| | 100.0% | | |

| Comparative Example A 1:20 (phosphate:carbonate)[1] | |
|---|---|
| $Na_2CO_3$ | 10.30 |
| $Na_2SiO_3$ | 5.30 |
| LAS, 97% | 0.24 |
| STPP | 0.48 |
| KOH, 45% | 0.03 |
| Coconut fatty acid | 0.10 |
| Water | qs |
| | 100.00% |

| Comparative Example B |
|---|
| Grease Guard ™ |
| A commercially available composition which does not contain a carbonate salt and contains an organic thickener. |

| Comparative Example C | |
|---|---|
| STPP | 3.00 |
| LAS, 97% | 0.25 |
| Water | qs |
| | 100.0% |

| Comparative Example D | |
|---|---|
| STPP | 10.00 |
| KOH, 45% | 0.17 |
| Oleic fatty acid | 0.56 |
| Water | qs |
| | 100.0% |

| Comparative Example E | |
|---|---|
| $Na_2CO_3$ | 5.30 |
| SLS, 30% | 0.80 |
| Water | qs |
| | 100.0% |

| Comparative Example F | |
|---|---|
| $Na_2CO_3$ | 10.00 |
| KOH, 45% | 0.17 |
| Oleic fatty acid | 0.56 |
| Water | qs |
| | 100.0% |

| Comparative Example G | |
|---|---|
| $Na_2CO_3$ | 5.97 |

| | |
|---|---|
| STPP | 0.60 |
| KOH, 45% | 0.17 |
| Oleic fatty acid | 0.56 |
| Water | qs |
| | 100.0% |

[1] . . . Formulation from Russian Patent SU 1,671,678.

Glossary of Terms

TSP Trisodium phosphate
LAS Linear dodecyl benzene sulfonic acid
STPP Sodium tripolyphosphate
TEA Triethanolamine
Tween 20 Polyethyleneoxide (20) sorbitan monolaurate
SLS Sodium lauryl sulfate
Hodag PGS-W1 Polyglycerol stearate
Schercotaine Cocoamidopropylbetaine Examples 1–20 were tested as previously described and all exhibited effective soil release. The Example 1 composition exhibited excellent soil release in hot water only but was not very soluble in the use solution when applied. The composition of Example 5 replacing LAS with sodium laurylsulfate (SLS) gave the same excellent results with increased solubility in the use solution. Best results were obtained using sodium lauryl sulfate or fatty acid soaps as the surfactant, oleic fatty acid providing the best results for the soaps. Screening of different surfactants, Examples 17–19, showed that all were more effective than Comparative Example A. The combination of surfactants, Example 9, also showed effective soil removal.

The composition of Example 20 was tested against the compositions of Comparative Examples A and B and was superior in soil release. After immersion in only hot water, the test soil peeled off the panel surface while the material of Comparative Example A did not remove all of the soil and left behind a white film.

When performance was tested, those compositions containing only phosphate or only carbonate (Comparative Examples D, E, and F respectively) were inferior (even to the Russian formula, Comparative Example A). Also, increasing the ratio outside of the 1:8 phosphate:carbonate ratio (as in Comparative Example G) resulted in poor soil removal.

In an attempt to discover the mechanism by which some of the aforementioned formulas did or did not affect soil release, scanning electron microscope ("SEM") photos were taken of test panels coated with various formulas, Examples 3, 7, and 10 and Comparative Example A. The compositions of Examples 3, 7, and 10 appear as a smooth, almost continuous film, while Comparative Example A exhibits more cracks and breaks, exposing the underlying panel. These photos also demonstrated the synergistic effect of both phosphate and carbonate to form the physical barrier on the test panels, when compared to the composition of Comparative Example C, which contains only the phosphate salt.

The above specification, examples and experimentation provide a basis for understanding the invention. However, the invention can be made in a variety of embodiments without departing from the spirit and scope of the invention. Accordingly, the invention appears in the claims hereinafter appended.

We claim:

1. A barrier coating composition for heat transfer surfaces comprising:

(a) about 0.1 to 99 wt-% of an inorganic salt composition having a phosphate source and a carbonate source in a weight ratio of about 10:1 to 1:8, and (b) about 0.01 to 30 wt-% of a surfactant composition; wherein the coating composition forms a substantially uniform barrier between the heat transfer surface and soil.

2. The composition of claim 1, wherein the inorganic salt composition is an alkali metal salt.

3. The composition of claim 1, wherein the surfactant composition is an anionic, amphoteric or nonionic surfactant and mixtures thereof.

4. The composition of claim 3, wherein the surfactant composition is a mixture of an anionic and amphoteric surfactant.

5. The composition of claim 3, wherein the anionic surfactant is an alkali metal or alkanolamine salt of a $C_{6-24}$ saturated or unsaturated carboxylic acid or mixtures thereof, an alkylarylsulfonic acid or an alkyl sulfuric acid.

6. The composition of claim 3, wherein the amphoteric surfactant has a cationic amino group and an anionic carboxylate or sulfonate group.

7. The composition of claim 3, wherein the nonionic surfactant is a glycerol fatty acid ester, a polyoxyethylene glycerol fatty acid ester, a polyoxyethylene sorbitan fatty acid ester, a polyethyleneglycol fatty acid ester or a polyoxyethylene-polyoxypropylene block copolymer with terminal hydroxyl groups.

8. A barrier coating composition for heat transfer surfaces comprising:

(a) about 0.25–90 wt-% of an inorganic salt composition consisting of an alkali metal phosphate and an alkali metal carbonate in a weight ratio about 4:1 to 1:1; and (b) about 0.015 to 25 wt-% of an anionic, amphoteric or nonionic surfactant and mixtures thereof wherein the coating composition forms a substantially uniform barrier between the heat transfer surface and soil.

9. The composition of claim 8, wherein the anionic surfactant is an alkali metal or alkanolamine salt of a $C_{6-24}$ saturated or unsaturated carboxylic acid or mixtures thereof, an alkylarylsulfonic acid or an alkyl sulfuric acid.

10. The composition of claim 9, wherein the anionic surfactant is a sodium, potassium or triethanolamine salt of oleic or coconut fatty acid or mixture thereof.

11. The composition of claim 9, wherein the anionic surfactant is sodium lauryl sulfate, potassium lauryl sulfate or ammonium lauryl sulfate.

12. The composition of claim 8, wherein the amphoteric surfactant has a cationic amino group and an anionic carboxylate or sulfonate group.

13. The composition of claim 12, wherein the amphoteric surfactant is cocoamidopropylbetaine or cocoamidoethylbetaine or sodium lauriminodipropionate.

14. The composition of claim 8, wherein the nonionic surfactant is a glycerol fatty acid ester, a polyoxyethylene glycerol fatty acid ester, a polyoxyethylene sorbitan fatty acid ester, a polyethyleneglycol fatty acid ester or a polyoxyethylene-polyoxypropylene block copolymer with terminal hydroxyl groups.

15. A method for forming a barrier coating on a surface in a heated food preparation unit, which coating facilitates removal of hardened or baked-on food soils, said coating formed from an aqueous coating composition, which method comprises:

applying an aqueous coating composition comprising:

(a) about 0.1 to 30 wt-% of an inorganic salt composition consisting of an alkali metal phosphate and an alkali metal carbonate in a weight ratio of about 10:1 to 1:8;

(b) about 0.1 to 20 wt-% of an anionic, amphoteric or nonionic surfactant and mixtures thereof; and (c) water;

wherein the coating composition forms a substantially uniform barrier between the surface and the soil on drying.

16. The method of claim 15, wherein the anionic surfactant contained in the aqueous coating composition is an alkali metal or alkanolamine salt of a $C_{6-24}$ saturated or unsaturated carboxylic acid or mixture thereof, an alkylarylsulfonic acid or an alkyl sulfuric acid.

17. The method of claim 16, wherein the anionic surfactant is a sodium, potassium or triethanolamine salt of oleic or coconut fatty acid or a mixture thereof.

18. The method of claim 16, wherein the anionic surfactant is sodium lauryl sulfate, potassium lauryl sulfate or ammonium lauryl sulfate.

19. The method of claim 15, wherein the amphoteric surfactant contained in the aqueous coating composition has a cationic amino group and an anionic carboxylate or sulfonate group.

20. The method of claim 19, wherein the amphoteric surfactant is cocoamidopropylbetaine, cocoamidoethylbetaine or sodium lauriminopropionate.

21. The method of claim 15, wherein the nonionic surfactant contained in the aqueous coating composition is glycerol fatty acid ester, a polyoxyethylene glycerol fatty acid ester, a polyoxyethylene sorbitan fatty acid ester, a polyethyleneglycol fatty acid ester or a polyoxyethylene-polyoxypropylene block copolymer with terminal hydroxyl groups.

22. The method of claim 15, wherein the weight ratio of alkali metal phosphate to alkali metal carbonate in the inorganic salt composition is about 4:1 to 1:1.

23. The method of claim 15, wherein the surfactant in the aqueous coating composition is a mixture of an anionic and an amphoteric surfactant.

* * * * *